(12) United States Patent
Lin et al.

(10) Patent No.: US 8,125,775 B2
(45) Date of Patent: Feb. 28, 2012

(54) THIN TYPE MOUSE

(75) Inventors: Yin Yu Lin, Taipei Hsien (TW); Shu I Chen, Taipei Hsien (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 219 days.

(21) Appl. No.: 12/545,867

(22) Filed: Aug. 24, 2009

(65) Prior Publication Data

US 2011/0043988 A1 Feb. 24, 2011

(51) Int. Cl.
*G06F 1/16* (2006.01)
(52) U.S. Cl. ............ 361/679.4; 715/711; 248/118; 400/489
(58) Field of Classification Search .......... 715/711, 715/728, 754, 863; 345/158, 156, 173, 161, 345/660; 248/118, 118.1; 74/551.9; 400/489; 361/679.31, 679.32, 679.33, 679.34, 679.4, 361/679.55, 679.57
See application file for complete search history.

(56) References Cited

U.S. PATENT DOCUMENTS

| | | | | |
|---|---|---|---|---|
| 4,917,516 A | * | 4/1990 | Retter | 400/489 |
| 2006/0033714 A1 | * | 2/2006 | Boldin | 345/163 |
| 2007/0152110 A1 | * | 7/2007 | Fong | 248/118 |

FOREIGN PATENT DOCUMENTS

| | | |
|---|---|---|
| TW | M263571 | 5/2005 |
| TW | M267498 | 6/2005 |
| TW | M269511 | 7/2005 |
| TW | M282256 | 12/2005 |
| TW | 200734908 | 9/2007 |

* cited by examiner

*Primary Examiner* — Hung Duong
(74) *Attorney, Agent, or Firm* — Chun-Ming Shih

(57) ABSTRACT

A thin type mouse includes a main body and a finger ring. The main body has a top surface and a bottom surface. The finger ring is removably attached to the top surface of the main body. The finger ring not only can prevent the user's palm from sliding off the main body, but also can force the user's palm to rest on the top surface of the main body. Therefore, the user's hand is not easily tired.

10 Claims, 2 Drawing Sheets

THIN TYPE MOUSE

BACKGROUND

The present invention relates to thin type mice and, more particularly, to a thin type mouse including a finger ring.

Some portable computers, such as notebook computers, generally include thin type mice which are easy to store and carry. Such a thin type mouse is disclosed in Taiwan Patent No. M269511 and Taiwan Patent No. M267498. The top surface of the thin type mouse, which is quite different from a curved top surface of a conventional mouse, is substantially flat. Although the thin type mouse is prone to be thinner and thinner, a user is used to grasp the thin type mouse as usual as for the conventional mouse. Therefore, the user may enjoy advantages of the thin type mouse, but has to endure problems of the thin type mouse.

One problem is that, since the thickness of the thin type mouse is very small, the thin type mouse is hard to be grasped by the user's hand. When the thin type mouse is moved on a table, the user's hand easily slides off the thin type mouse. Another problem is that, if the grasping manner for the thin type mouse is same as the conventional mouse, a space is formed between the user's hand the thin type mouse. As a result, when the thin type mouse is used, the user's palm isn't supported, so that the user's hand is easily tired.

Taiwan Patent No. 200734908 discloses a thin type mouse including a first housing and a second housing rotatable relative to the first housing. The first and second housings are substantially flat so as to package the first and second housings easily. When the thin type mouse needs to be used, the first or second housing is rotated, and the first and second housings form an arcuate shape. Therefore, the problems described above can be solved. However, another problem is raised, that is, when the thin type mouse is in use, the thin type mouse is incapable of sliding on a flat surface freely with the first and second housings tightly contacting the flat surface.

Taiwan Patent No. M263571 discloses a mouse with a finger ring. The mouse includes a housing. The finger ring is disposed on the left side of the front housing. A right button is disposed on the right side of the finger ring, and a left button is disposed inside of the finger ring. In use, a user's index finger passes through the finger ring so as to hang the mouse under the user's palm. In this way, the user's hand does not need to grasp the mouse, so that the user's hand muscles are not easily tired. However, an operation manner of the mouse is quite different from that of a conventional mouse, which does not fit in with a normal using habit.

Taiwan Patent No. M282256 discloses a mouse which is convenient for moving. The mouse includes an information obtaining panel and a finger ring mounted to the information obtaining panel. In operation, the finger ring is sleeved on a finger of a user's one hand, and an interface of the information obtaining panel for receiving information faces towards the user's palm. Therefore, fingers of the user's the other hand may conveniently move on the interface of the information obtaining panel to realize input or control. However, the mouse is actually a touch panel. The finger ring of the mouse is only configured for fixing the mouse to the user's one hand, in order that fingers of the user's the other hand may conveniently move on the interface of the information obtaining panel.

BRIEF SUMMARY

The present invention provides a thin type mouse having an improved structure.

To achieve at least one of the above-mentioned advantages or other advantages, the present invention provides a thin type mouse. The thin type mouse includes a main body and a finger ring. The main body has a top surface and a bottom surface. The finger ring is removably attached to the top surface of the main body.

In an embodiment of the present invention, the main body has a first connecting portion, and the finger ring has a second connecting portion. At least one of the first connecting portion and the second connecting portion is a magnet, and the other of the first connecting portion and the second connecting portion is attracted by the magnet. The main body includes a housing having a top surface and a bottom surface. The top surface defines a groove therein. The first connecting portion is fixed in the groove. The main body further includes a cover. The cover defines a plurality of positioning grooves opposite to the first connecting portion, and each of the positioning grooves respectively receives the second connecting portion.

To achieve at least one of the above-mentioned advantages or other advantages, the present invention provides a thin type mouse. The thin type mouse includes a main body and a finger ring. The main body includes a housing having a top surface, a first connecting portion fixed to the top surface of the housing, and a cover configured for covering the housing. The finger ring has a second connecting portion coupled to the first connecting portion of the main body.

In an embodiment of the present invention, one of the first connecting portion and the second connecting portion is a female fastener, and the other of the first connecting portion and the second connecting portion is a male fastener coupled to the female fastener.

In another embodiment of the present invention, one of the first connecting portion and the second connecting portion is a threaded hole, and the other of the first connecting portion and the second connecting portion is a threaded nut for engaging in the threaded hole.

The thin type mouse includes a finger ring configured for being sleeved on a user's index finger or middle finger. The finger ring not only can prevent the user's palm from sliding off the main body, but also can force the user's palm to rest on the top surface of the main body. Therefore, the user's hand is not easily tired.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
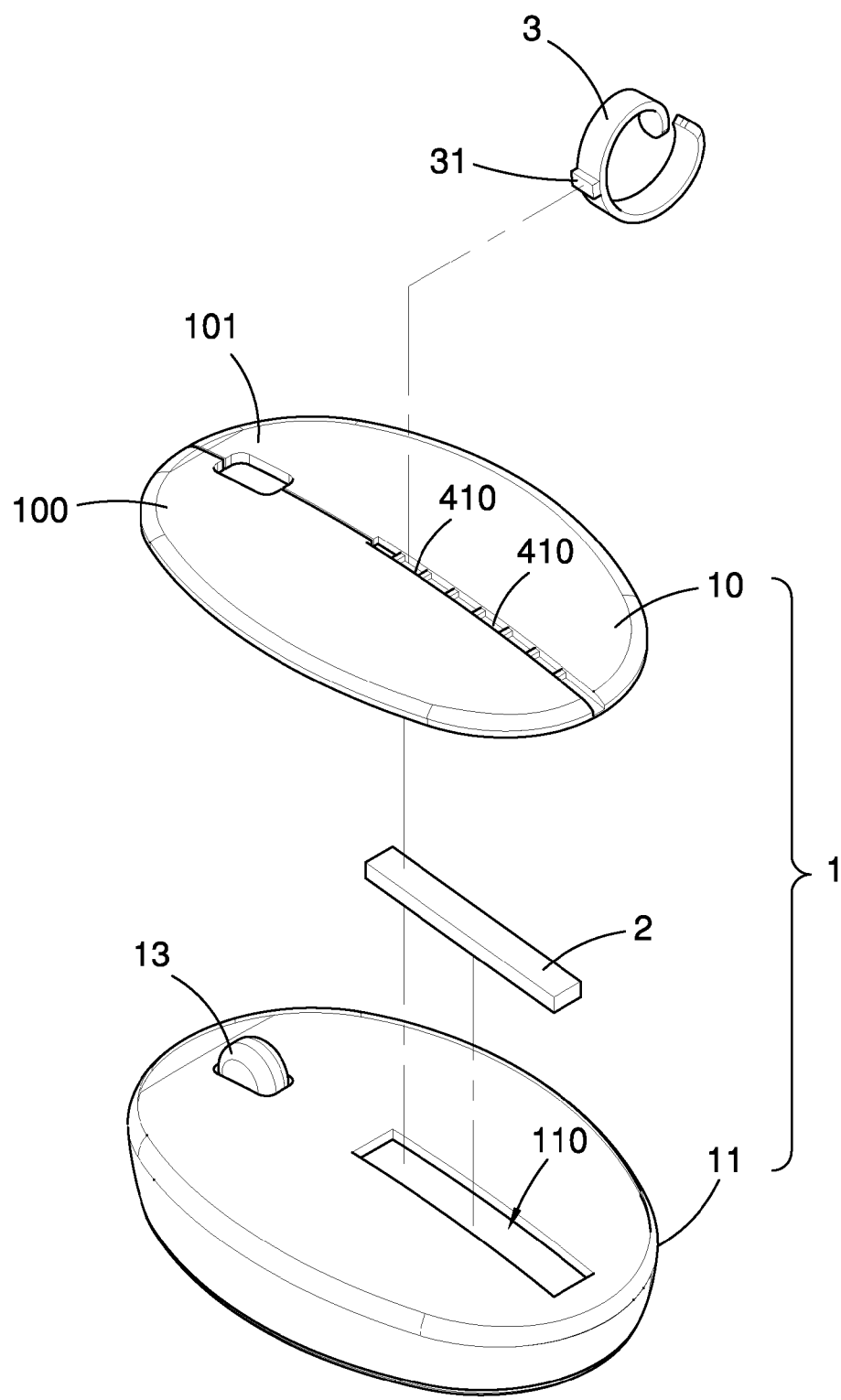
FIG. 1 is a schematic, exploded, isometric view of a thin type mouse in accordance with the present invention.
Figure 2:
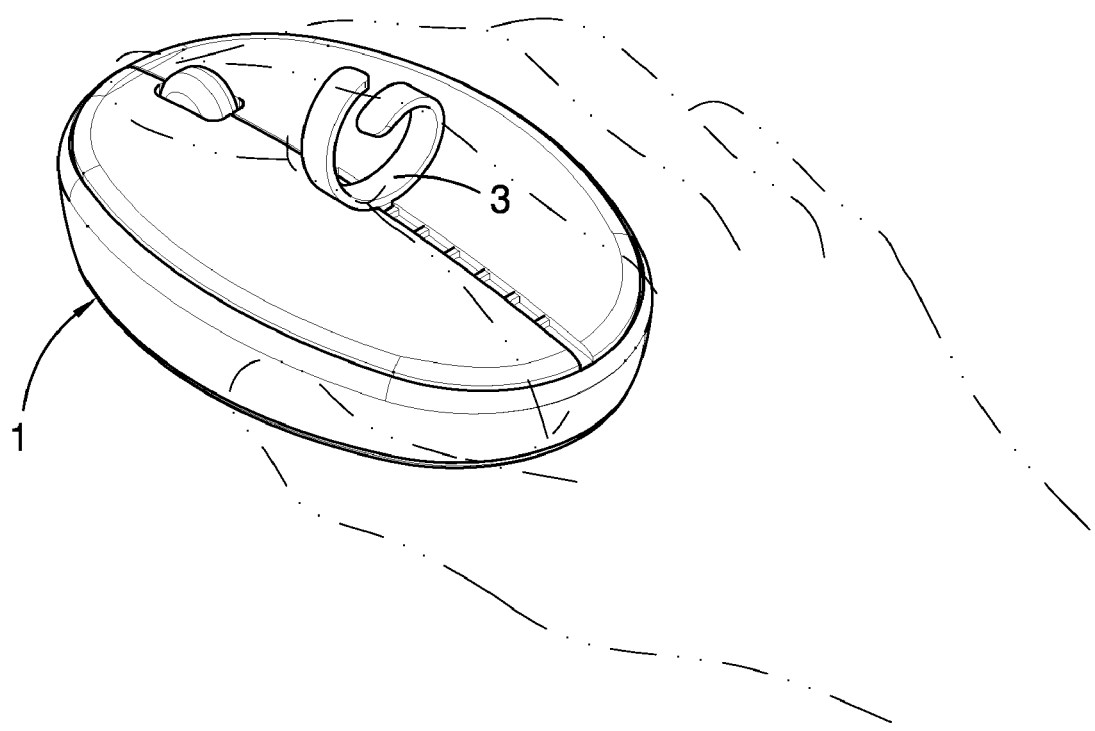
FIG. 2 is an assembled perspective view of the thin type mouse of FIG. 1.
Figure 3:
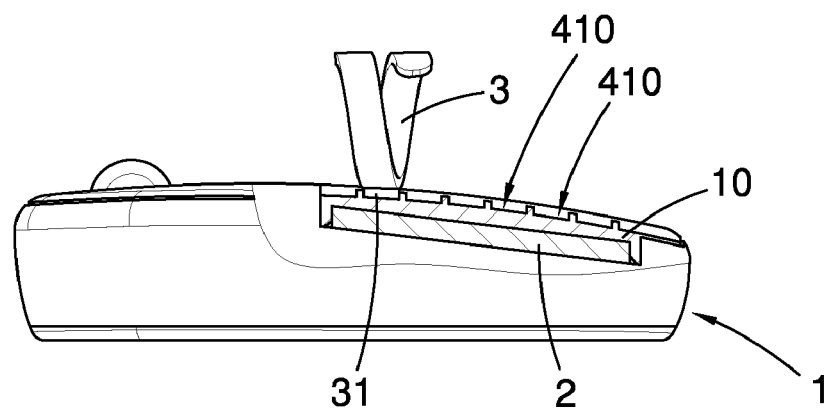
FIG. 3 is a partial, cross-sectional view of the thin type mouse of FIG. 2.

FIGS. 1-3 show a preferred embodiment of a thin type mouse of the invention. The thin type mouse is a wired mouse or a wireless mouse which is connected to a computer (not shown).

As shown in FIG. 1, the thin type mouse includes a main body 1 and a finger ring 3. As shown in FIG. 2, the main body 1 has a top surface and a bottom surface. The finger ring 3 is removably attached to the top surface of the main body 1, and the finger ring 3 is configured for being sleeved on a user's index finger or middle finger. By providing the finger ring 3 attached to the top surface of the main body 1, a user's palm may not easily slide off the main body 1. Further, the user's palm is supported by the top surface of the main body 1, so that the user's palm is not easily tired.

As shown in FIG. 1, the main body 1 has a first connecting portion 2, and the finger ring 3 has a second connecting portion 31. In detail, the main body 1 further includes a housing 11 and a cover 10. The housing 11 has a top surface and a bottom surface. The top surface of the housing 11 defines a groove 110 therein. The main body 1 further includes a roller 13 recessed in the housing 11, and a part of the roller 13 projects out of the top surface of the housing 11. The first connecting portion 2 of the main body 1 is fixed in the groove 110 of the housing 11.

The cover 10 is configured for covering the top surface of the housing 11, and has a left button 100 and a right button 101. The roller 13 is located between the left button 100 the right button 101, and acts as a middle button. The roller 13 is rotated to control the scroll of a screen displayed on a computer. The left button 100 and the right button 101 may be pressed to control the computer, such as replying to an enter command. The bottom surface of the housing 11 may be moved on a flat surface, thereby controlling a cursor displayed on the computer.

As shown in FIG. 3, the first connecting portion 2 of the main body 1 is a magnet, and the second connecting portion 31 of the finger ring 3 is also a magnet. Therefore, due to a magnetic force between the first connecting portion 2 of the main body 1 and the second connecting portion 31 of the finger ring 3, the finger ring 3 may be attached to the top surface of the main body 1. When the finger ring 3 is not in use, the finger ring 3 may be pulled out of the main body 1 via applying an external force.

It should be pointed out that, either the first connecting portion 2 or the second connecting portion 31 may not be a magnet. For instance, one of the first connecting portion 2 and the second connecting portion 31 is a magnet, and the other of the first connecting portion 2 and the second connecting portion 31 is attracted by the magnet.

Alternatively, the first connecting portion 2 and the second connecting portion 31 are not limited magnets. For example, one of the first connecting portion 2 and the second connecting portion 31 may be a threaded hole, and the other of the first connecting portion 2 and the second connecting portion 31 may be a threaded nut for engaging in the threaded hole. For another example, one of the first connecting portion 2 and the second connecting portion 31 may be a female fastener, and the other of the first connecting portion 2 and the second connecting portion 31 may be a male fastener coupled to the female fastener.

As shown in FIG. 1 and FIG. 3, the cover 10 defines a plurality of positioning grooves 410 opposite to the first connecting portion 2. Each of the positioning grooves 410 may respectively receives the second connecting portion 31. In such way, the user may adjust the finger ring 3 to an appropriate position according to the user's operation habits.

As shown in FIG. 2, the finger ring 3 is preferred spiral-shaped, and is flexible. In such case, the finger ring 3 may be made of a material with ductile ability. The internal diameter of the finger ring 3 may be adjusted to fit different fingers.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A thin type mouse comprising:
a main body having a top surface and a bottom surface; and
a finger ring removably attached to the top surface of the main body,
wherein the main body has a first connecting portion, the finger ring has a second connecting portion, at least one of the first connecting portion and the second connecting portion is a magnet, and the other of the first connecting portion and the second connecting portion is attracted by the magnet.

2. The thin type mouse according to claim 1, wherein the main body includes a housing having a top surface and a bottom surface, the top surface defines a groove therein, and the first connecting portion is fixed in the groove.

3. The thin type mouse according to claim 2, wherein the main body further includes a cover, the cover defines a plurality of positioning grooves opposite to the first connecting portion, and each of the positioning grooves respectively receives the second connecting portion.

4. The thin type mouse according to claim 3, wherein the finger ring is spiral-shaped, and is flexible.

5. A thin type mouse comprising:
a main body comprising:
a housing having a top surface;
a first connecting portion fixed to the top surface of the housing;
a cover configured for covering the housing;
a finger ring having a second connecting portion coupled to the first connecting portion of the main body,
wherein the top surface of the housing defines a groove therein, and the first connecting portion is fixed in the groove, and
wherein at least one of the first connecting portion and the second connecting portion is a magnet, the other of the first connecting portion and the second connecting portion is attracted by the magnet.

6. The thin type mouse according to claim 5, wherein the cover defines a plurality of positioning grooves opposite to the first connecting portion, and each of the positioning grooves respectively receives the second connecting portion.

7. The thin type mouse according to claim 5, wherein the cover has a left button and a right button.

8. The thin type mouse according to claim 5, further comprising a roller recessed in the housing, a part of the roller projecting out of the top surface of the housing, and the roller being located between the left button and the right button.

9. A thin type mouse comprising:
a main body comprising:
a housing having a top surface;
a first connecting portion fixed to the top surface of the housing;
a cover configured for covering the housing;
a finger ring having a second connecting portion coupled to the first connecting portion of the main body, wherein one of the first connecting portion and the second connecting portion is a female fastener, and the other of the first connecting portion and the second connecting portion is a male fastener coupled to the female fastener.

10. A thin type mouse comprising:
a main body comprising:
a housing having a top surface;
a first connecting portion fixed to the top surface of the housing;
a cover configured for covering the housing;
a finger ring having a second connecting portion coupled to the first connecting portion of the main body,
wherein one of the first connecting portion and the second connecting portion is a threaded hole, and the other of the first connecting portion and the second connecting portion is a threaded nut for engaging in the threaded hole.

\* \* \* \* \*